Sheet 1. (2 Sheets.)

J. F. Keeler.

Platform-Scale.

No. 3032 Reissued Jul. 14, 1868.

J. F. Keeler
Platform-Scale.

No. 3032 Reissued Jul. 14, 1868.

UNITED STATES PATENT OFFICE.

J. F. KEELER, OF PITTSBURG, PENNSYLVANIA.

IMPROVEMENT IN PLATFORM-SCALES.

Specification forming part of Letters Patent No. 11,729, dated September 26, 1854; Reissue No. 3,032, dated July 14, 1868.

*To all whom it may concern:*

Be it known that I, J. F. KEELER, late of Cleveland, in the county of Cuyahoga, in the State of Ohio, have invented a new and useful Improvement in the Construction of Scales; and I do hereby declare that the following is a full and exact description thereof, reference being had to the accompanying drawings, and to the letters of reference marked thereon.

Figure 1:
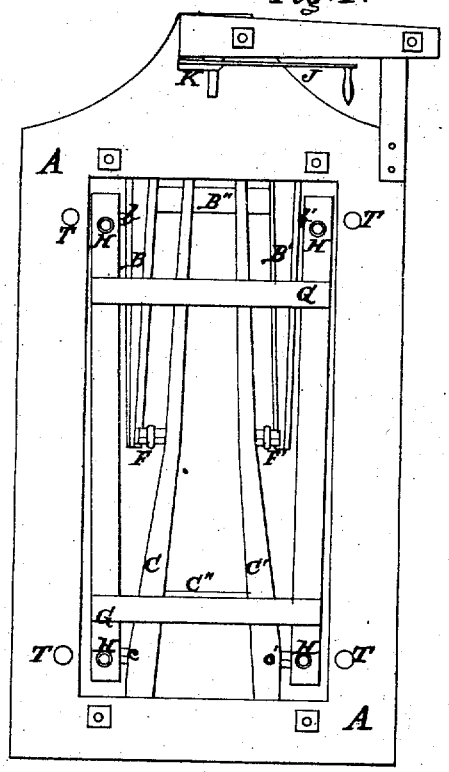
Figure 2:
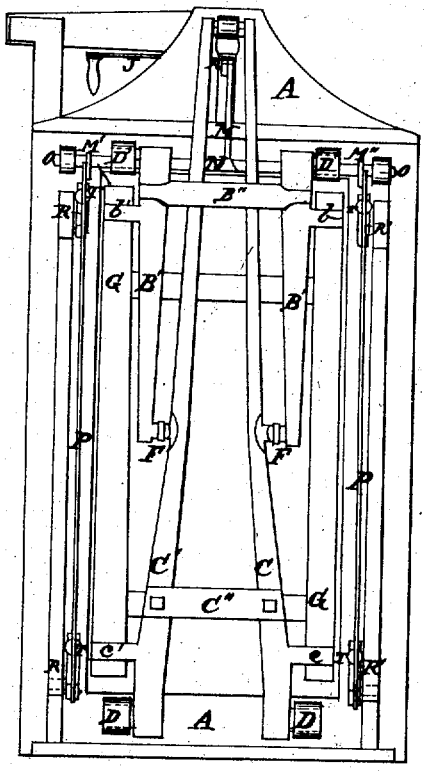
Figure 4:
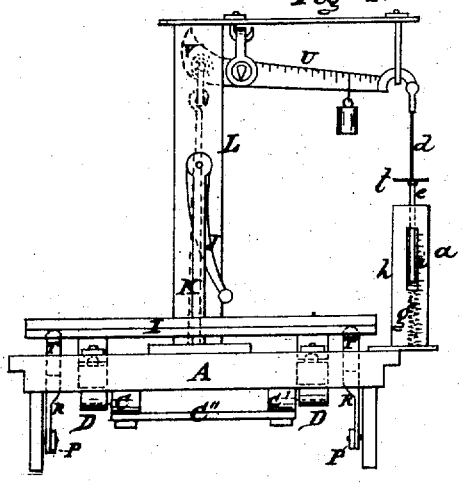
Figure 3:
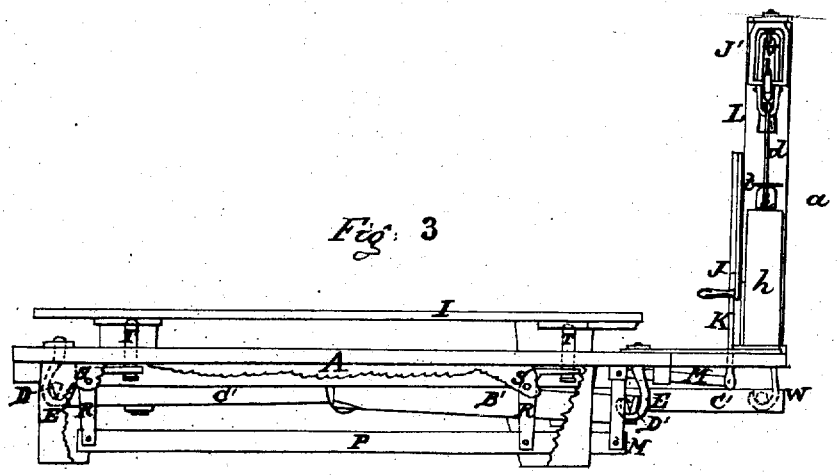

Figure 1 in the drawings is a plan view of my improved platform-scales; Fig. 2, a view of the scales inverted; Fig. 3, a side elevation; Fig. 4, an end view, and Fig. 5 a view of the end opposite to that shown in Fig. 4.

Similar letters in the several figures represent the same parts.

A A represent the frame of the scales, to which are hung the levers B B′ and C C′, Figs. 1 and 2, by means of the hooks or hangers, as seen at D D D′ D′, Figs. 2 and 3. The arms or bearings of the levers, by which the levers are supported by the hangers, are of the usual form of scale joints or bearings, as seen at E E′, Fig. 3. The small end of the levers B B′ are hung to the long levers by a link, as seen at F F′, Figs. 1 and 2. The levers B B′ are united by the connections B″, and the levers C C′ are united by the connections C″. From the sides of these levers extend the four arms *b b′* and *c c′*, which are V-shaped, and upon which rests the frame G. In this frame are inserted four points or pivots, H H H H, Figs. 1 and 4. Upon these points the platform I rests when weighing is being done. This secures a more perfect and uniform action of the scales by preventing the swerving or jostling of the levers while the platform is raised or lowered. The platform is raised from and lowered to the frame G by a device on the under side of the frame, in connection with the lever J and connecting-rod K. The lever J moves upon a pin or fulcrum secured to the standard L, Figs. 3, 4, and 5. To the short end of this lever J is attached the rod K by a pin-joint, and the other end of the rod is attached to the lever M, Figs. 2 and 3, which lever is connected to the shaft N. This shaft is hung in bearings at the ends, as seen at O O, Fig. 2. Near to the bearings are secured two more levers, M′ M″, which, in connection with the lever M, form a right-angled lever, as seen in Fig. 3. At the end of the lever M′ M″ are attached by pin-joints the connecting-rods P P, and to the connecting-rods are attached the right-angled levers R R and R′ R′ by pin-joints. These levers move upon pins secured to the sides of the frame, as seen at S, Fig. 3. In the upper arms of the levers R R are slots, in which are fitted the necks of the pins T, &c., which form shoulders above the lever and heads below, so that they move up and down with the levers. By this combination and arrangement the platform is raised and lowered by the lever J as may be required. When the lever is in the position seen in Figs. 4 and 5, the platform is raised from off the frame G and rests upon the pins T, in which position the articles are placed upon the platform to be weighed, thereby preventing the levers and bearings from sustaining injury by jarring or straining when loading or unloading the scales, or while running a car or other thing over them.

By turning the lever J to J′ the platform decends with its load and rests on the pivots H, ready to be weighed. The connection of the scale-beam U to the levers C C is in the usual manner, as seen at V and W, Figs. 3, 4, and 5.

Figure 5:
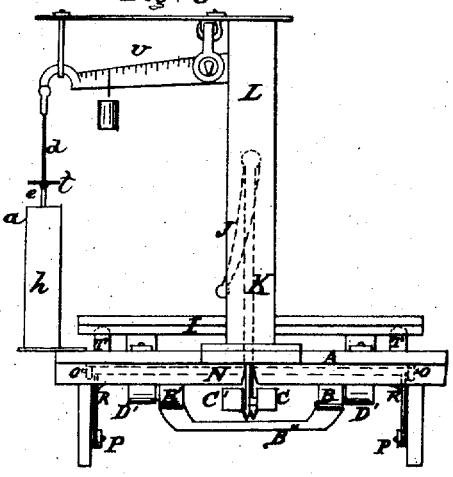

For the purpose of facilitating the operation of weighing, I have combined with the vibrating or weighing beam of the platform-scale a spring-balance, as seen at *a*, Figs. 3, 4, and 5. To the end of the beam U is attached by a pivot joint the rod *d*, which hooks into the spring-rod *r* under the table *f*. I attach this spring-balance to any style of vibrating or weighing beam however used, whether with or without the platform-scale machinery.

The spring *g′*, which is connected to the spring-rod *r*, is inclosed in the case *h*.

*i* is the indicator and scale of weight.

The rod *d* may be detached from the spring-rod *r* and the scales used without it.

The spring-balance, in combination with the scale-beam, (or the platform-scale,) may be used in weighing freight, &c., where great celerity is desirable. In such cases, if the poise is not used, it is placed at zero, and the weights upon the table *f*, showing the larger denominations of weight in whole numbers and the fractions on the index *i*.

In some cases I hang the weights for the larger denominations on a table independent of the spring balance, or I use poises on the beam therefor.

It will be perceived that this improvement is simply a combination of the weighing-beam of a common scale with the spring-balance of whatever form, which is all that I claim to have invented, and not the broad ground or idea of combining two or more kinds of indices or scales of whatever construction. This ground I distinctly disclaim, and confine myself exclusively to a combination of the two specified species of scales mentioned.

By this combination and arrangement of the weighing-beam with the spring-balance may readily be weighed any number of boxes, barrels, or other articles by simply placing them, one at a time, onto and off from the scale without moving a weight or a poise, whenever the difference in weight between the articles to be weighed does not exceed the capacity of the spring-balance.

The frame G, in connection with the platform I, forms a kind of double platform, and as the platform I is raised and lowered to and from the frame G the levers are not swayed about, but are retained in place by the frame G.

Another feature of improvement which distinguishes my platform-scales from all others is the raising the platform independently of the levers. When the levers are raised and lowered and not the platform, the result is that the bearings and sockets wear off unequally; but in my improvement the levers are not raised and lowered, but the platform only, which is raised equally at all times without regard to the position of the weights upon it, which, either with or without the frame G, (used or not at will,) distinguishes it from all other platform-scales in use.

I do not limit myself to the particular mode or means described, for it is obvious that other means substantially the same in function may be employed.

What I claim as my invention, and desire to secure by Letters Patent, is

1. The combination of a platform-scale with a device acting independently of the weighing-levers, for the purpose of raising or lowering the platform simultaneously at all points, when constructed and operating substantially as described.

2. In combination with the weighing-levers of a platform-scale, the intermediate platform or frame G, constructed and operating in the manner and for the purpose substantially as set forth 3. The combination of a spring-balance with the vibrating beam of a weighing-scale, substantially as and for the purpose set forth.

JOEL F. KEELER.

Witnesses:

O. M. EDWARDS,

FRANK BUSHNELL.